US 6,743,511 B2

United States Patent
Dittrich et al.

(10) Patent No.: US 6,743,511 B2
(45) Date of Patent: Jun. 1, 2004

(54) METHOD OF MANUFACTURING A PTFE PREFORM USING THERMAL FUSION

(75) Inventors: Roxanne Dittrich, Houston, TX (US); Taggart William Albert Mills, San Antonio, TX (US)

(73) Assignee: Coltec Industrial Products LLC, Newton, PA (US)

( * ) Notice: Subject to any disclaimer, the term of this patent is extended or adjusted under 35 U.S.C. 154(b) by 3 days.

(21) Appl. No.: 10/212,631

(22) Filed: Aug. 5, 2002

(65) Prior Publication Data

US 2003/0034582 A1 Feb. 20, 2003

Related U.S. Application Data

(60) Provisional application No. 60/309,976, filed on Aug. 3, 2001.

(51) Int. Cl.[7] .............................................. B32B 27/08
(52) U.S. Cl. ...................... 428/422; 428/515; 156/229; 156/308.2; 156/312
(58) Field of Search .................................. 264/112, 113, 264/127; 156/229, 308.2, 312; 428/515, 422

(56) References Cited

U.S. PATENT DOCUMENTS

| 4,102,966 A | 7/1978 | Duperray et al. |
| 5,683,639 A | 11/1997 | Ebnesajjad et al. |
| 5,846,577 A | 12/1998 | Dalton et al. |

FOREIGN PATENT DOCUMENTS

| DE | 19753131 | 6/1999 |

OTHER PUBLICATIONS

International Search Report mailed Jan. 10, 2003 corresponding to PCT/US 02/24496.

*Primary Examiner*—Stephen J. Lechert, Jr.
(74) *Attorney, Agent, or Firm*—John M. Harrington; Kilpatrick Stockton LLP

(57) ABSTRACT

This invention relates to methods for manufacturing large PTFE parts by compression molding followed by sintering. The method comprises layering modified and unmodified PTFE in a mold, and compressing the layers to form a preform part. Once the preform parts are formed, they are assembled such that the areas of preform parts which are to be bonded together are the modified PTFE sections. The parts are then sintered and the modified PTFE sections bond together creating a strong, durable, bond.

10 Claims, 1 Drawing Sheet

METHOD OF MANUFACTURING A PTFE PREFORM USING THERMAL FUSION

CROSS REFERENCE TO RELATED APPILCATIONS

This application claims the benefit of U.S. Provisional Application No. 60/309,976 filed Aug. 3, 2001.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The invention relates to a method for manufacturing PTFE preform parts and finished articles. More particularly this invention relates to compression molding of granular PTFE followed by sintering to produce articles of a size and length not possible utilizing conventional PTFE molds or presses.

BACKGROUND

PTFE (polytetrafluoroethylene) is commonly used for industrial applications such as gaskets, fittings, valve bodies, diaphragms and other applications where a non-reactive or low friction surface is needed. It has a wide range of operating temperatures and is extremely chemical resistant.

Small PTFE parts are manufactured through a compression molding process by disposing granular PTFE in a mold and compressing it under pressure to fuse the particles together. A limitation to this process is the size requirements of the press. The presses are quite expensive and generally larger presses are even more expensive. In typical PTFE compaction a 3-1 compaction ratio is necessary to achieve the desired product. For small parts, such as a 12 inch long tube, a three foot press with a 5 foot clearance will suffice. However, if the desired part is 60 inches in length, a 15 foot press with a 25 foot clearance would be necessary. While 60 inch and larger parts are often needed, presses of this size are not readily available, if at all.

One method to circumvent the need for an unmanageably large press is to manufacture the large part in pieces and thermally fuse the pieces together. Unfortunately, this cannot be accomplished with standard PTFE. Standard PTFE cannot be thermally fused with any degree of success. The finished product would be brittle at the joints and would break apart easily.

A modified PTFE which is susceptible to thermal fusing could be used instead of conventional PTFE. In this process, individual pieces of modified PTFE are compression molded and then sintered together. However, modified PTFE will become more lubricious in the oven during sintering and become distorted and unable to finish to the dimensions required. Furthermore, a large article comprised of modified PTFE would not be able to hold up to its own weight during sintering and may collapse. Thus, a part comprised of modified PTFE will not maintain its shape in the oven, while an unmodified PTFE part will not fully bond and be brittle at the seams. Using either method has proven unpractical for manufacturing large seamless articles out of PTFE.

Therefore, it would be beneficial to have a method of manufacturing a PTFE containing part which can be made in segments and thermally fused together without losing desirable properties of the PTFE.

SUMMARY OF THE INVENITON

A first embodiment of the method of the present invention comprises, disposing a first layer of a modified PTFE resin into a mold cavity, exposing the first layer to a first pressure, disposing a second layer of an unmodified PTFE resin into the mold cavity, and exposing the first and second layers to a second pressure, such that the second pressure is higher than the first pressure.

In another embodiment of the present invention the method further comprises disposing a third layer of modified PTFE resin in the mold cavity and applying a third pressure wherein the third pressure is higher than the first pressure or the second pressure. Large articles may be formed by manufacturing more than one preform, assembling the preforms so that the first modified layer of one preform contacts the first or third modified layer of another platform, and sintering the assembly.

In a further embodiment of the present invention, a method for manufacturing a PTFE article is presented comprising, manufacturing a PTFE preform by disposing a first layer of a modified PTFE resin into a mold cavity, exposing the first layer to a first pressure, disposing a second layer of an unmodified PTFE resin into the mold cavity, exposing the first and second layers to a second pressure, optionally disposing a third layer of modified PTFE resin into the mold cavity and exposing the first, second and third layers to a third pressure. Then placing the preform parts adjacent to one another such that the layer of modified resin of one part is contacting the layer of modified resin of the other part, and sintering the parts together form a single article.

A feature and advantage of the present invention provides a method of manufacturing articles of a size, length and shape that heretofore was not possible due to machinery limitations.

Another feature and advantage of the present invention is a method for producing large PTFE articles which are strong and seamless.

Another feature and advantage of the present invention is a method for bonding PTFE pieces without creating weak or brittle seams or joints.

Another feature and advantage of the present invention is a method for sintering PTFE pieces without loosing their shape during the sintering process.

Another feature and advantage of the present invention is a method for manufacturing large, net or near net PTFE articles.

These and other aspects of the subject invention and the method of using the same will become more readily apparent to those having ordinary skill in the art from the following detailed description of the invention taken in conjunction with the drawings described herein below.

DETAILED DESCRIPTION

Preform parts made according to the present invention are used as precursor parts to a finished article. The preform parts are made through a compression molding process and sintered together through a thermal fusion process. The compression molding process generally involves loading a mold with both conventional and modified granular PTFE and compacting it in a press under a pressure. Once the preform pieces are individually constructed they are assembled and sintered in a thermal fusion process.

The molds used may be of any shape necessary to produce the desired finished product. They may be cylindrical, square, rectangular, oval or any shape that provides the nearest shape to the finished part. The number of parts, and the shapes that are preformed depend on the shape and size of the finished product. As discussed earlier, the size of conventional PTFE pieces are limited by the size requirements of the press used to form them. This invention allows articles of any size to be formed by sintering smaller parts together.

As an example part, but by no means intended to limit the invention, this application will discuss a method for making a long cylindrical part. A cylinder is perhaps the most common shape for large PTFE parts and may be used for tank, pipe, and vessel lining. The processes and methods outlined with respect to the cylinder are easily adaptable to other PTFE parts of various shapes and sizes all of which are within the scope of the present invention.

Figure 1:
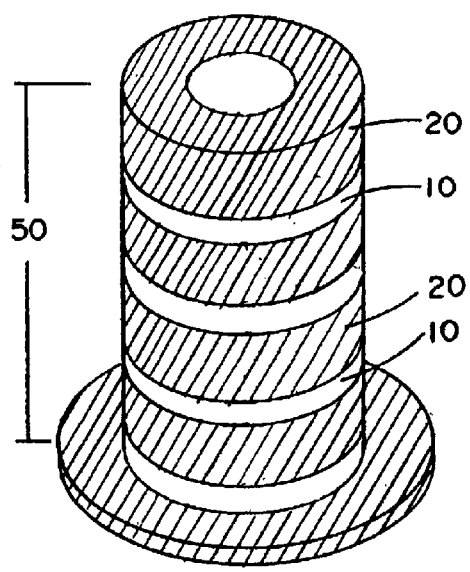
FIG. 1 shows a side view of a long cylinder with a flange type end made according to the process of the present invention.
Figure 2:
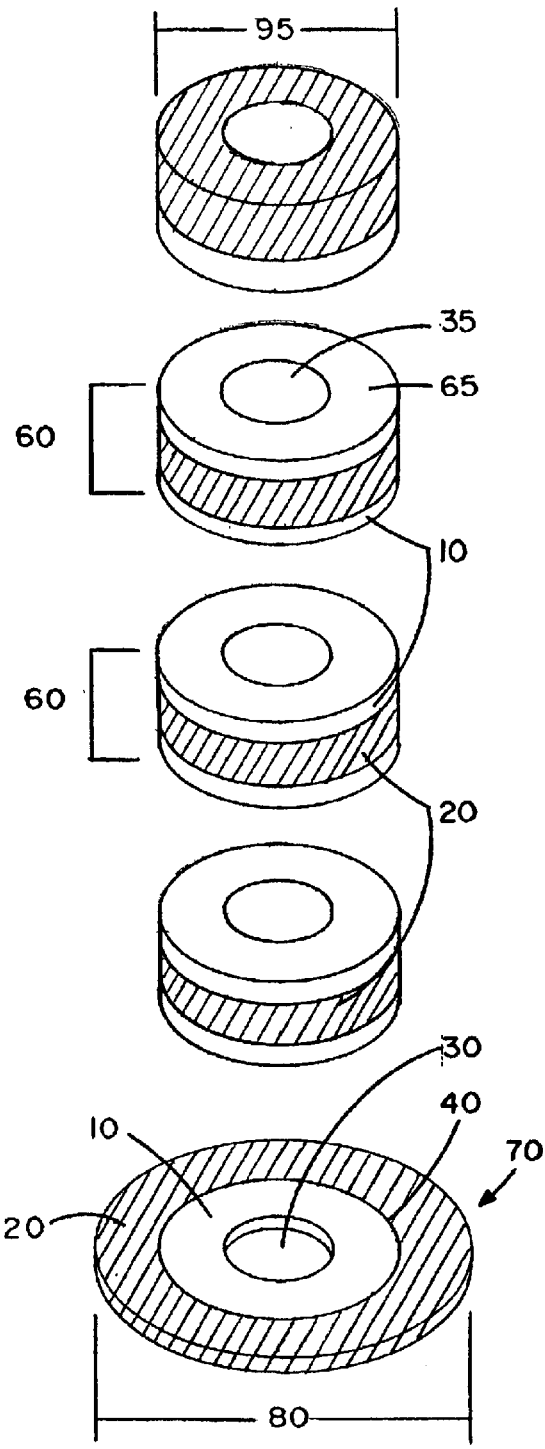
FIG. 2 shows a side exploded view of a long cylinder with a flange type end made according to the present invention.

Referring to the cylinder of FIGS. 1 and 2, these parts are long tubes with a flange end. The cylinder of FIG. 1 is approximately 60 inches long. Thus, under conventional processes discussed in the Background section, the press clearance used to form the part by conventional means would have to be at least 25 feet long to obtain the proper compression. By making the long cylinder in sections, as shown in FIG. 2, the press clearance required is only 5 feet. This process is capable of producing twelve inch sections. The sections may then be placed end to end to make the finished article.

The bottom ring 70 shown in FIGS. 1 and 2 has an outer diameter 80 of approximately 36 inches. The inner diameter 90 of the bottom ring 70 is approximately 24 inches. The cylindrical sections 60 have outer diameters 95 of approximately 30 inches and inner diameters 35 corresponding to the inner diameter 90 of the bottom ring 70. The wall thickness 65 of the cylindrical sections 60 is approximately 1.5 inches. These measurements are given as an example of the dimensions of an article made according to the process of the present invention. As discussed above, articles of a variety of shapes and sizes are possible to produce by employing the present invention.

Each section 60 comprises layers of modified 10 and unmodified 20 (conventional) PTFE. Modified PTFE is modified with an additive, typically less than 1 percent Perfluoropropylene Vinyl Ether (PPVE) or a copolymer containing PPVE. The modified PTFE is located at any site on the part which is to be sintered to another part. As can be seen in FIG. 2 the top and bottom parts of the article have only one layer of PTFE with the un-attached end comprising unmodified PTFE. The inner pieces have two layers of modified PTFE, one layer at each end where the piece is to be joined to another piece, with a layer of unmodified PTFE in between.

To create a perform part, first a layer of modified PTFE is loaded into the mold cavity. The amount of PTFE used is calculated based on the area of the mold to be filled and the specific gravity of the resin used. The modified PTFE is compressed at a first pressure to ensure that the layer is evenly filled. The pressure is preferably no more than 20 psi, more preferably the first pressure no more than 15 psi. It is also possible to practice the method of the present invention with a first pressure of about 0 psi.

Next a layer of conventional, unmodified, granular PTFE is loaded into the mold cavity on top of the modified PTFE. The mold, loaded with the modified and unmodified layers of PTFE, is pressed in a conventional PTFE hydraulic press at a second pressure, preferably higher than the first pressure, and more preferably substantially higher than the first pressure. In an embodiment of the present invention comprising only two layers, the second pressure is between about 2500 psi and about 3000 psi. This pressure will compact the PTFE into a finished part. Typical mold closure and dwell times are utilized in this process as they are in conventional PTFE processing.

In an embodiment of the present invention wherein the preform part is to be attached to two other preform parts, a second layer of modified PTFE is loaded into the mold before the final pressure of 2500–3000 psi is applied. In this embodiment, a second pressure is applied to ensure the unmodified PTFE has evenly filled the mold, before the third layer of modified PTFE is added, and thus, a pressure of less than 20 psi and preferably less than 15 psi is sufficient. It is also possible to practice this embodiment of the present invention with a second pressure of about 0 psi.

When a part has two sections, one modified PTFE and one unmodified PTFE, the second pressure is the compression pressure which compacts the PFTE layers and forms the piece. The first pressure is provided to ensure that the layers are evenly filled. In an embodiment with three sections, two modified PTFE sections and one unmodified PFTE section, the third pressure is the compression pressure which compacts the PTFE layers and forms the piece. The first two pressures are provided to ensure that the layers are evenly filled.

Generally, in a cylindrical embodiment as shown in FIGS. 1 and 2, the modified PTFE sections 10 on each perform part are between about 0.5 inch and about 2.5 inches long. In a preferred embodiment, the modified PTFE sections are from about 1.25 inches to 1.75 inches long, and in a most preferred embodiment, these sections are about 1.5 inches long.

Referring to FIG. 1, the individual sections 50 of preform parts are 12 inches long. In this example, the modified PTFE sections 10 on the ends are about 1.5 inches long, making the unmodified PTFE sections 20 about 9 inches long. The length of the modified PTFE sections 10 on the ends of the pieces will vary depending on the shape and size of the parts being sintered together.

It should also be noted that although the method of this invention is particularly useful in the manufacture of large PTFE articles, it may also be employed to make smaller articles. In another embodiment of the present invention, the article to be made is small enough to be made using a conventional press, however it may still be desirable to manufacture preform parts individually and sinter them together. For example, if the article to be made is of a shape not easily molded in one piece, such as a part with a flange or flanges, it may be constructed in pieces and bonded together through the method of the present invention.

An embodiment of the method of the present invention further comprises assembly of the molded pieces and sintering them together into a finished article. Referring again to FIGS. 1 and 2, any areas of the preform pieces that are to be fused together are matched so that modified PTFE 10 on one piece mates with modified PTFE 10 on the adjoining part.

Once assembled, the parts are placed in an oven for sintering. A typical ramping up and down oven cycle is used. The length of time required at maximum sintering temperature is dependant on the largest cross section of a part. Additional time is also added at maximum sintering temperature to account for any decreases in airflow due to longer than usual lengths.

In another embodiment of the present method it is desirable to apply slight pressure to the parts during sintering. Pressure applied at this time, forces the parts together and provides for a more complete bond. This may not be necessary for large parts, i.e. over 300 pounds, as the weight of the part will provide enough pressure. However, for small or thin walled parts, slight pressure may facilitate bonding. A pressure of about 0 to about 15 psi is sufficient.

The modified PTFE and unmodified PTFE also shrink at different rates during the sintering process. Therefore, the rates of heating and cooling must be carefully controlled to prevent the PTFE layers from contracting at different rates and pulling away from one another. Typical cycles for parts of different wall thicknesses are shown in the Examples 1–3. Variations of peak times and sintering temperatures are utilized for other wall thickness. Shapes other than cylinders will have varying peak times and temperatures dependant on the shape, thickness and size of the pieces.

EXAMPLES

Example 1

Sintering of a Tube With a 3.25 Inch Wall Thickness

| Time (hours) | Sintering step | Temperature (° F.) |
| --- | --- | --- |
| 14 | heat to | 500 |
| 5 | hold at | 500 |
| 6 | heat to | 685 |
| 24 | hold at | 685 |
| 8 | cool to | 500 |
| 5 | hold at | 500 |
| 12 | cool to | 150 |

Example 2

Sintering of a Tube With a 2.75 Inch Wall Thickness

| Time (hours) | Sintering step | Temperature (° F.) |
| --- | --- | --- |
| 12 | heat to | 500 |
| 4 | hold at | 500 |
| 4 | heat to | 685 |
| 16 | hold at | 685 |
| 8 | cool to | 500 |
| 2 | hold at | 500 |
| 4 | cool to | 150 |

Example 3

Sintering of a Tube With a 2.0 Inch Wall Thickness

| Time (hours) | Sintering step | Temperature (° F.) |
| --- | --- | --- |
| 10 | heat to | 550 |
| 4 | hold at | 550 |
| 4 | heat to | 685 |
| 14 | hold at | 685 |
| 6 | cool to | 500 |
| 2 | hold at | 500 |
| 4 | cool to | 150 |

The foregoing descriptions of the preferred embodiments of the invention have been presented for the purpose of illustration and description and are not intended to exhaustive or to limit the invention to the precise forms disclosed. Numerous modifications and adaptations thereof will be apparent to those skilled in the art without departing from the spirit and scope of the present invention.

We claim:

1. A method for manufacturing a PTFE article, comprising;
   (a) manufacturing at least two preform parts according to a method comprising the steps of;
      disposing a first layer of a modified PTFE resin into a mold cavity;
      exposing the first layer to a first pressure;
      disposing a second layer of an unmodified PTFE resin into the mold cavity;
      exposing the first and second layers to a second pressure;
   (b) placing the at least two preform parts adjacent to one another such that one of the layers of modified resin of one part is contacting one of the layers of modified resin of another part; and
   (c) sintering the at least two preform parts together to form a single article.

2. The method of claim 1, wherein the first pressure is an externally applied pressure of about 0 psi.

3. The method of claim 1, wherein the first pressure is an externally applied pressure of no more than about 15 psi.

4. The method of claim 1, wherein the second pressure is an externally applied pressure of between about 2500 to about 3000 psi.

5. The method of claim 1, further comprising disposing a third layer of modified PTFE resin in the mold cavity and applying a third pressure, wherein the third pressure is higher than the first and second pressures.

6. The method of claim 5, wherein the second pressure is an externally applied pressure of about 0 psi.

7. The method of claim 5, wherein the third pressure is an externally applied pressure of between about 2500 to about 3000 psi.

8. The method of claim 1, wherein the amount of modified resin disposed is determined based on the area of the mold to be filled and the specific gravity of the resin.

9. The method of claim 1, wherein a pressure is applied to the at least two preform parts during sintering.

10. A PTFE article made by the method of claim 1.

* * * * *

UNITED STATES PATENT AND TRADEMARK OFFICE
CERTIFICATE OF CORRECTION

PATENT NO. : 6,743,511 B2
DATED : June 1, 2004
INVENTOR(S) : Roxanne Dittrich and Taggart William Albert Mills It is certified that error appears in the above-identified patent and that said Letters Patent is hereby corrected as shown below:

Column 6,
Line 17, that portion reading "illustration and description and are not intended to exhaus-," should read -- illustration and description and are not intended to be exhaus --.

Signed and Sealed this

Eighth Day of February, 2005

JON W. DUDAS
*Director of the United States Patent and Trademark Office*